(12) United States Patent
Sato

(10) Patent No.: US 9,874,645 B2
(45) Date of Patent: Jan. 23, 2018

(54) POS SYSTEM, BAR CODE SCANNER, AND METHOD FOR CONTROLLING POS SYSTEM

(75) Inventor: Hidetoshi Sato, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 68 days.

(21) Appl. No.: 14/122,497

(22) PCT Filed: Sep. 12, 2011

(86) PCT No.: PCT/JP2011/071177
§ 371 (c)(1),
(2), (4) Date: Nov. 26, 2013

(87) PCT Pub. No.: WO2012/164766
PCT Pub. Date: Dec. 6, 2012

(65) Prior Publication Data
US 2014/0081786 A1    Mar. 20, 2014

(30) Foreign Application Priority Data

May 27, 2011 (JP) .................................. 2011-119184

(51) Int. Cl.
*G06Q 20/00* (2012.01)
*G01T 7/12* (2006.01)
(Continued)

(52) U.S. Cl.
CPC .............. *G01T 7/12* (2013.01); *G06Q 20/201* (2013.01); *G06Q 20/208* (2013.01); *G07G 1/009* (2013.01); *G07G 1/0045* (2013.01); *G08B 21/182* (2013.01)

(58) Field of Classification Search
CPC ...... G01T 1/169; G08B 21/182; G06Q 20/208
(Continued)

(56) References Cited

U.S. PATENT DOCUMENTS 7,797,204 B2 * 9/2010 Balent ................. G06Q 10/087
 705/26.8
7,805,319 B2 * 9/2010 Badinelli .............. G06F 19/324
 705/2
(Continued)

FOREIGN PATENT DOCUMENTS

JP 6-22932 U 3/1994
JP 2004-252994 A 9/2004
JP 2011-100371 A 5/2011

*Primary Examiner* — Ig T An
(74) *Attorney, Agent, or Firm* — Sughrue Mion, PLLC

(57) ABSTRACT

Provided is a POS system including: a storage part for storing a product code for identifying a product and a radiation dose or a radioactivity threshold defined for each product code, the product code and the radiation dose or the radioactivity threshold being associated with each other; a scanner part including a product reading part for reading a product code attached to a product, and a radioactivity measurement part for measuring a radiation dose emitted from the product or radioactivity defined based on the radiation dose; a comparison part for comparing a radiation does or a radioactivity threshold corresponding to the product code read by the product code reading part and a value measured by the radioactivity measurement part with each other; and an alert output part for outputting an alert when the measured value exceeds the threshold.

3 Claims, 17 Drawing Sheets

(51) Int. Cl.
  *G07G 1/00* (2006.01)
  *G06Q 20/20* (2012.01)
  *G08B 21/18* (2006.01)
  *G06G 1/14* (2006.01)

(58) Field of Classification Search
  USPC .................................................. 705/22, 23
  See application file for complete search history.

(56) References Cited

U.S. PATENT DOCUMENTS

| | | | | |
|---|---|---|---|---|
| 2008/0263011 | A1* | 10/2008 | Badinelli | G06F 19/324 |
| 2010/0156644 | A1* | 6/2010 | Tomita | G01T 1/161 |
| | | | | 340/600 |
| 2011/0054930 | A1* | 3/2011 | Badinelli | G06F 19/324 |
| | | | | 705/2 |
| 2011/0068906 | A1* | 3/2011 | Shafer | G06K 7/0008 |
| | | | | 340/10.3 |
| 2012/0271712 | A1* | 10/2012 | Katzin | G06Q 30/06 |
| | | | | 705/14.51 |

\* cited by examiner

| PRODUCT CODE | PRODUCT NAME | CLASSIFICATION | UNIT PRICE (YEN) | RADIOACTIVITY THRESHOLD (Bq) | RADIOACTIVITY REFERENCE VALUE (Bq) |
|---|---|---|---|---|---|
| 4910000000001 | WELSH ONION | VEGETABLE | 90 | 8 | 16 |
| 4910000000002 | PORK RIBS | MEAT | 470 | 4 | 8 |
| 4910000000003 | FRESH MILK | MILK | 160 | 4 | 8 |
| ⋮ | | | | | |

FIG. 3

| PRODUCT CODE | PRODUCT NAME | CLASSIFICATION | UNIT PRICE (YEN) | RADIOACTIVITY THRESHOLD (Bq) | RADIOACTIVITY REFERENCE VALUE (Bq) | RADIOACTIVITY MEASUREMENT DETERMINATION FLAG |
|---|---|---|---|---|---|---|
| 4910000000001 | WELSH ONION | VEGETABLE | 90 | 8 | 16 | 1 |
| 4910000000002 | PORK RIBS | MEAT | 470 | 4 | 8 | 1 |
| 4910000000003 | FRESH MILK | MILK | 160 | 4 | 8 | 1 |
| ... | | | | | | |
| 4910000000010 | T SHIRT (S) | CLOTHING | 1000 | 16 | 32 | 1 |
| 4910000000011 | POLO SHIRT (S) | CLOTHING | 1500 | 16 | 32 | 1 |
| ... | | | | | | |
| 4910000000050 | CD CASE | SUNDRIES | 100 | - | - | 0 |
| 4910000000051 | TRASH BOX | SUNDRIES | 500 | - | - | 0 |

FIG. 6

POS SYSTEM, BAR CODE SCANNER, AND METHOD FOR CONTROLLING POS SYSTEM

CROSS REFERENCE TO RELATED APPLICATIONS

This application is a National Stage of International Application No. PCT/JP2011/071177 filed Sep. 12, 2011, claiming priority based on Japanese Patent Application No. 2011-119184 filed May 27, 2011, the contents of all of which are incorporated herein by reference in their entirety.

TECHNICAL FIELD

This invention relates to a point of sales system (POS system), a barcode scanner, and a control method for a POS system.

BACKGROUND ART

As a POS system (point of sales management system) installed on a store such as a supermarket, there is known a POS system disclosed in Japanese Unexamined Patent Application Publication (JP-A) No. 2011-100371 (Patent Literature 1), for example.

DISCLOSURE OF THE INVENTION

Problem to be Solved by the Invention

By the way, even if a product is radioactively contaminated, the POS system disclosed in Patent Literature 1 does not have means for checking the radioactive contamination of the product, and thus has such a problem that the radioactive contamination of the product can be checked by neither a store side nor a consumer side.

Moreover, various products such as foods, clothing, residential supplies, and household goods are sold to consumers in stores in the distribution industry. Possibility of radioactive contamination of these products exists in respective steps on a distribution route such as "manufacture of products", "transport of products", "wholesales", "transport", "arrival at store", and "display in store".

This invention solves the conventional problem, and specifically, provides a POS system, a barcode scanner, and a control method for POS system which enable check of absence/presence of the radioactive contamination of products without a great increase in workload imposed on product sales, which is the final stage of the distribution route, and the like.

Means to Solve the Problem

In order to solve the above-mentioned problem, a POS system according to one embodiment of this invention includes: storage means for storing a product code for identifying a product and a radioactivity threshold defined for each product code, the product code and the radioactivity threshold being associated with each other; a barcode scanner including a barcode reading part for reading a product code from a barcode attached to a product, and a radioactivity measurement part for measuring radioactivity of the product based on a radiation dose emitted from the product; comparison means for comparing a radioactivity threshold corresponding to the product code read by the barcode reading part and a radioactivity measurement value measured by the radioactivity measurement part with each other; and alarm output means for outputting an alarm when the radioactivity measurement value exceeds the radioactivity threshold.

In order to solve the above-mentioned problem, a barcode scanner according to one embodiment of this invention includes: a barcode reading part for reading a product code from a barcode attached to a product; a transmission/reception part for transmitting the product code read by the barcode reading part, and receiving a radioactivity threshold corresponding to the product code; a radioactivity measurement part for measuring radioactivity of the product based on a radiation dose emitted from the product; a comparison part for comparing the radioactivity threshold received by the transmission/reception part and a radioactivity measurement value measured by the radioactivity measurement part with each other; and an alarm output part for outputting an alarm when the radioactivity measurement value exceeds the radioactivity threshold.

In order to solve the above-mentioned problem, a control method for a POS system according to one embodiment of this invention includes comparing, by comparison means, a radioactivity threshold corresponding to a product code of a product read by a barcode reading part of a barcode scanner and a radioactivity measurement value of the product measured by a radioactivity measurement part of the barcode scanner for measuring radioactivity of the product based on a radiation dose emitted from the product at the time of the product code reading of the product with each other, and outputting, by alarm output means, an alarm when the radioactivity measurement value exceeds the radioactivity threshold.

Effect of the Invention

According to this invention, whether or not a subject product is radioactively contaminated can be checked without increasing the workload greatly when the product code is read by providing the radioactivity measurement part on the scanner for reading the product code. Moreover, the possibility of radioactive contamination of the product exists in the respective steps in the distribution route such as "manufacture of products", "transport of products", "wholesales", "transport", "arrival at store", and "display in store". However, in this invention, whether or not the product is radioactively contaminated can be checked when the product is sold, which is the final stage of the distribution route, resulting in surely securing safety of the product sales.

BRIEF DESCRIPTION OF THE DRAWING

FIG. 3 is an explanatory diagram illustrating an example of a PLU file according to the first embodiment.

FIG. 6 is an explanatory diagram illustrating an example of a PLU file according to the second embodiment.

BEST MODE FOR EMBODYING THE INVENTION

Figure 1:
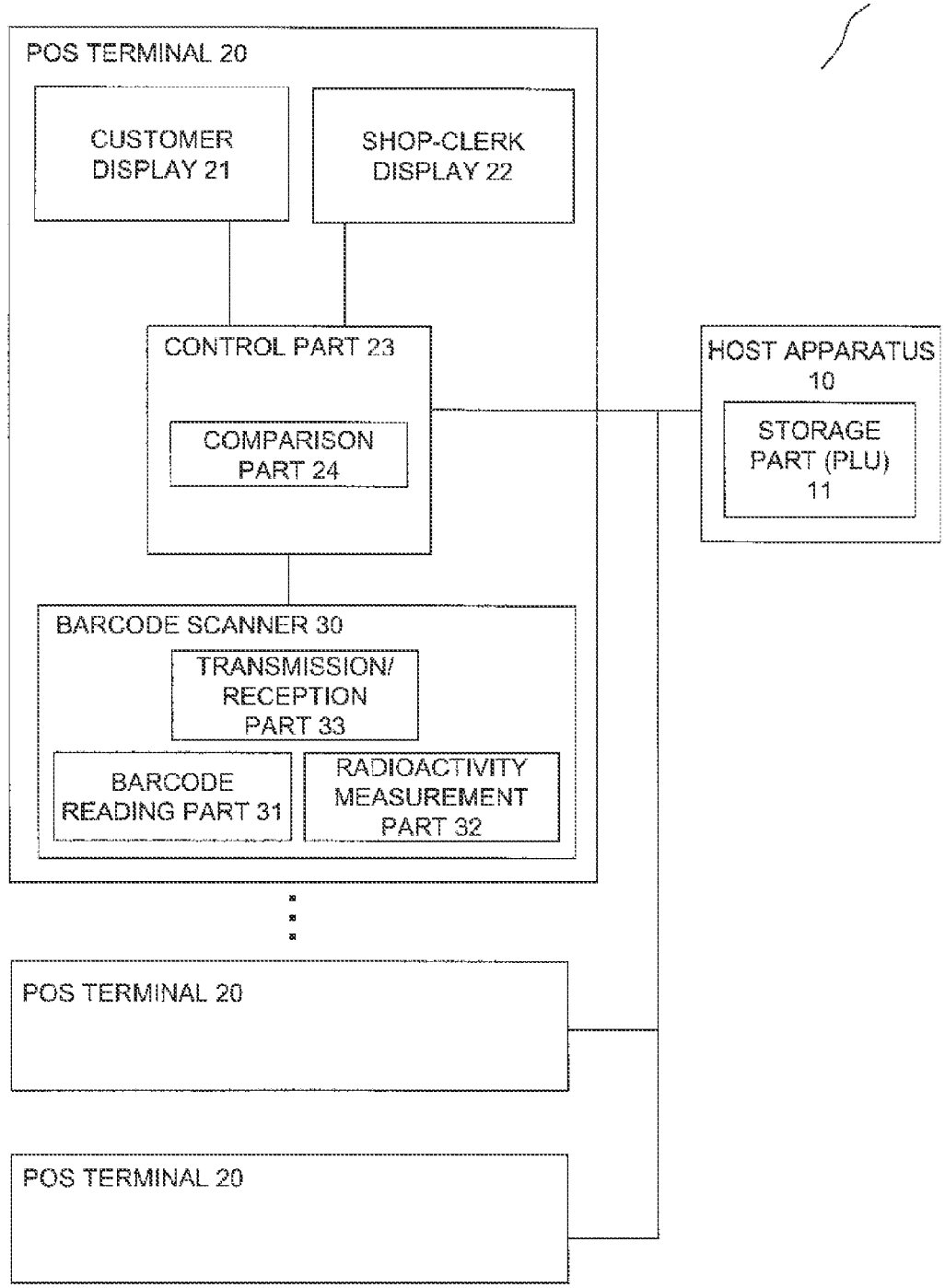
FIG. 1 is a schematic diagram illustrating a POS system according to a first embodiment of this invention.

A description is now given of POS systems according to a plurality of embodiments of this invention referring to the drawings.

First Embodiment

As illustrated in FIG. 1, a POS system 1 according to a first embodiment of this invention includes at least a host apparatus (POS host) 10, and a plurality of POS terminals 20 connected to a host apparatus 10 via a line such as a LAN. Note that, a description of an apparatus configuration less relevant to this invention is omitted. Moreover, a device described as a single device in this embodiment may be constructed by a plurality of separate devices, and conversely, respective devices described as a plurality of separate devices in this embodiment may be integrated.

The host apparatus 10 includes a storage part (storage means) 11, an input part, an output part, a control part, a communication part, and an auxiliary storage apparatus. The control part is constructed by a CPU and the like, and the storage part 11 is constructed by a ROM, a RAM, a hard disk, and the like.

The storage part 11 of the host apparatus 10 stores a price look up codes (PLU) file, and, in the PLU file according to this embodiment, as exemplified in FIG. 3, a "product name", a "classification", a "unit price", a "radioactivity threshold", and a "radioactivity reference value" are registered in association with a "product code" of each product.

On this occasion, the "radioactivity reference value" is a pubic reference value for radioactivity defined by a country or the like for each product or the like. Moreover, the "radioactivity threshold" is a private threshold of the radioactivity to be observed and uniquely defined by a store or the like. The "radioactivity reference values" are defined for respective products, and thus are not uniform. Further, the "radioactivity reference values" are temporarily or eternally reviewed. The "radioactivity threshold" is provided independently of the "radioactivity reference value" in this embodiment, but the "radioactivity reference value" itself may be used as the "radioactivity threshold". Moreover, radiation may be used as a reference for the threshold.

As illustrated in FIG. 1, the POS terminal 20 includes a customer display 21, a shop-clerk display 22 including a touch panel, a control part 23, a storage part, a communication part, and an auxiliary storage apparatus. The POS terminal 20 realizes respective parts described later by controlling the control part 23 to operate based on software deployed in the storage part. The control part 23 is constructed by a CPU and the like, and the storage part is constructed by a ROM, a RAM, a hard disk, and the like.

According to this embodiment, the touch panel of the shop-clerk display 22 functions as an input part and an output part of the POS terminal 20, and an input of the quantity of products is carried out also on the touch panel. Note that, a keyboard or the like may be used as the input part.

The control part 23 includes a comparison part (comparison means) 24. Though a detailed description is given later, the comparison part 24 compares the "radioactivity threshold" corresponding to a product code read by a barcode reading part 31 of a barcode scanner 30 and a "radioactivity measurement value" measured by a radioactivity measurement part 32 of the barcode scanner 30 with each other to identify whether or not the "radioactivity measurement value" exceeds the "radioactivity threshold". The control part 23 operates as an alert output part for outputting an alert based on an identification result in the comparison part 24. Though the comparison part 24 is provided in the control part 23 of the POS terminal 20 in this embodiment, the comparison part may be provided in the host apparatus 10 or the barcode scanner 30.

The POS terminal 20 further includes the barcode scanner 30 connected via a communication cable such as a USB cable.

As illustrated in FIG. 1, the barcode scanner 30 includes the barcode reading part 31, the radioactivity measurement part 32, and a transmission/reception part 33 for transmitting/receiving data to/from the control part 23.

The barcode reading part 31 has a well-known configuration, and has a function of reading product code from a barcode attached to a product.

The radioactivity measurement part 32 is provided integrally with the barcode scanner 30, and measures an amount of radioactivity of a product based on a radiation dose emitted from the product. According to this embodiment, the radioactivity measurement part 32 is constructed by a well-known geiger-mueller (GM) radiation dosimeter. Note that, necessary radioactivity value calculation may be carried out outside the barcode scanner 30. It is known that the α ray is blocked even by a material such as paper, and the γ ray exists in a large amount in a general environment, and thus causes a large measurement error. Therefore, in this embodiment, the radioactivity measurement part 32 is configured to detect the β ray passing through a general package. Note that, a specific aspect of the radioactivity measurement part 32 is not limited to the GM radiation dosimeter.

Figure 2:
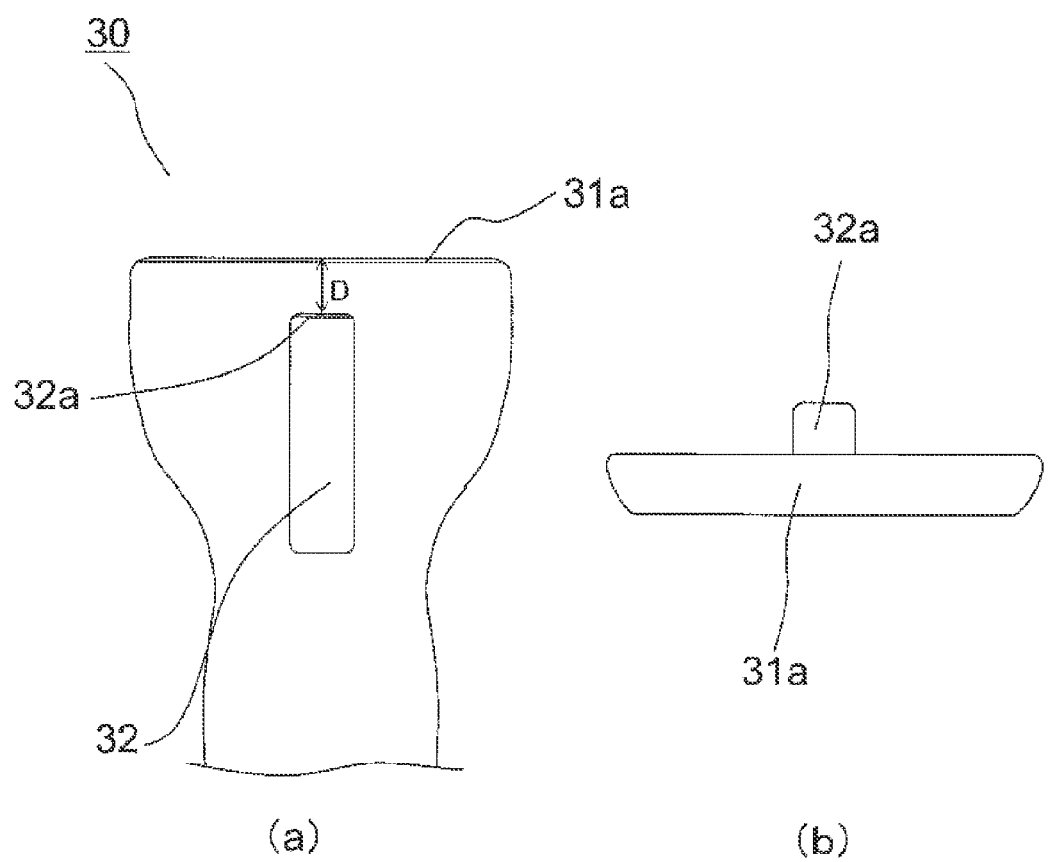
FIG. 2 includes (a) a top view and (b) a front view of a barcode scanner.

As illustrated in FIGS. 2(a) and 2(b), a window 32a for measuring radioactivity is provided on the barcode scanner 30 at a location backward by a distance D from a window 31a for reading barcode while the window 32a is directed in the same direction as the window 31a for reading barcode. The position at which the window 32a serving as a measurement surface for radioactivity measurement is provided may be determined based on a method and an apparatus for measuring radioactivity. Note that, FIG. 2(a) is a plan view and FIG. 2(b) is a front view. Note that, the radioactivity measurement part 32 may be built into the barcode scanner 30. With this configuration, when the radiation dose of a product is measured, a certain amount of space or more can be surely formed between the product and the window 32a for measuring radioactivity. As a result, an accurate radiation dose measurement can be realized. Note that, the distance D is set to 1 centimeter in this embodiment.

Figure 4:
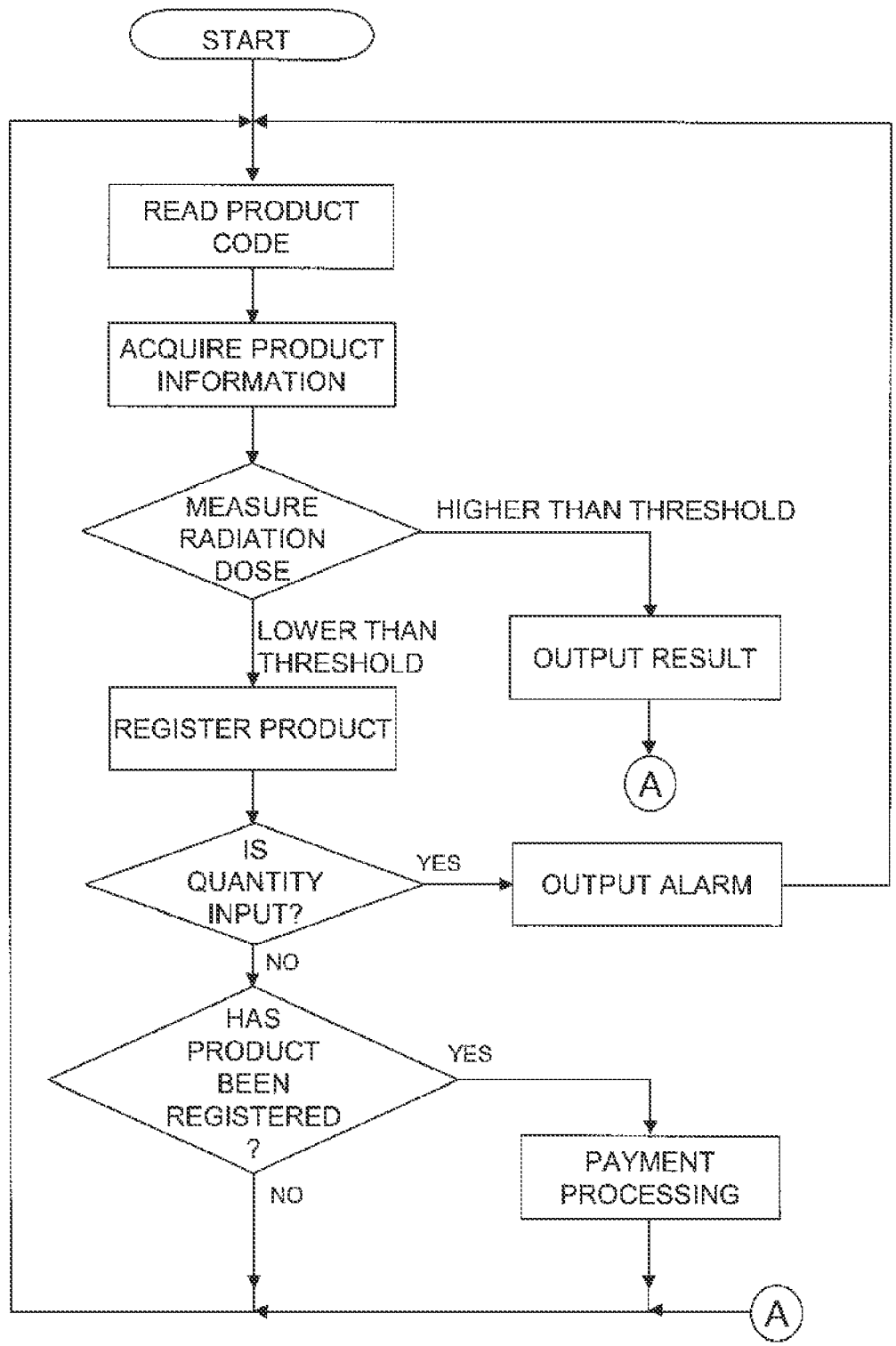
FIG. 4 is a flowchart illustrating a processing flow in the POS system according to the first embodiment.

Referring to FIG. 4, a description is now given of an example of a processing flow using the POS system according to the first embodiment.

In the POS system according to this embodiment, a "normal mode (mode without measuring the radiation dose" and a "radiation dose measurement mode" can be selected, and FIG. 4 is a processing flow in a case where a shop clerk selects the "radiation dose measurement mode" by using the touch panel (input part) or the like. Moreover, a simple or no description is given of well-known processing operations.

First, a product code is read from a barcode attached to a subject product by using the barcode reading part 31.

Then, the POS terminal 20 acquires various types of product information including the "radioactivity threshold" of the subject product from the PLU file stored in the storage part 11 of the host apparatus 10 based on the product code of the subject product read by the barcode reading part 31.

Then, the radioactivity measurement part 32 of the barcode scanner 30 starts the measurement of a radiation dose emitted from the subject product, thereby calculating the amount of the radioactivity of the subject product. Then, the comparison part 24 of the POS terminal 20 compares the "radioactivity measurement value" measured by the radioactivity measurement part 32 and the "radioactivity threshold" of the subject product acquired from the PLU file with each other (radioactive contamination check step).

In this embodiment, after the barcode is read by the barcode reading part 31 and the product information is acquired from the PLU file, the radioactivity measurement part 32 measures the radioactivity, and the comparison part 24 compares the "radioactivity measurement value" and the "radioactivity threshold" with each other. However, the POS system may be configured so that the reading of the barcode by the barcode reading part 31 and the radioactivity measurement by the radioactivity measurement part 32 are simultaneously carried out, and then, the acquisition of the product information and the comparison between the "radioactivity measurement value" and the "radioactivity threshold" are carried out.

In the radioactive contamination check step, if the "radioactivity measurement value" exceeds the "radioactivity threshold", product registration for the subject product is not carried out, but an alarm serving as an alert is output by the control part 23.

On this occasion, as an output destination of the alarm, the customer display 21, the shop-clerk display 22, an alarm sound output part and an alarm light output part independently provided at arbitrary locations, the host apparatus 10, and a cellular phone are conceivable, and these output destinations including other means may be arbitrarily selected or combined. Moreover, the alarm may be transmitted both to the shop clerk and the customer, or the alarm may be transmitted only to the shop clerk. Further, the alarm may be transmitted to a manager of the store or a manager of a store chain in addition to the shop clerk and/or the customer. In this case, the manager side such as the manager of the store and the manager of the store chain can acquire the information on the radioactive contamination of the products, and, for example, can sum up the number of contamination incidents to take an action of changing the suppliers of the products. Moreover, the alarm may not be transmitted to the shop clerk and/or the customer, but be transmitted only to the manager of the store, the manager of the shop chain, and the like. In this case, the manager side can acquire the information on the radioactive contamination of the products while disorder on the shop side is avoided. Moreover, as contents of the alarm, such a fact that the "radioactivity measurement value" exceeds the "radioactivity threshold", the "radioactivity measurement value", the "radioactivity threshold", and the "radioactivity reference value", and a massage, an alarm sound, and an alarm light prompting decontamination of the product or exchange of the product are conceivable, and these contents including other contents may be arbitrarily selected or combined.

Moreover, even if the "radioactivity measurement value" exceeds the "radioactivity threshold" in the radioactive contamination check step, the product registration may be carried out while the alarm is output. On this occasion, a mechanism may be added for notifying the customer that "small dose of radiation was detected" by using a receipt.

On the other hand, if the "radioactivity measurement value" does not exceed the "radioactivity threshold" in the radioactive contamination check step, the product registration of the product is carried out without outputting the alarm.

On this occasion, in general, if a plurality of the same products are to be registered, the quantity of the products is input after the first product is registered. However, in this embodiment, in order to surely measure the radioactivity for all products, if the quantity is input, an alarm is output, and the input of the quantity is invalidated. In order to register a plurality of the same products, the shop clerk carries out the product code reading for a plurality of times. The processing proceeds to the product code reading after the alarm output in the processing flow, but after such a message that "You cannot input quantity of products, and please scan product" may be output, and the processing may proceed to the product code reading after the shop clerk depresses a clear button. Moreover, the quantities may be tentatively accepted, and the products may be measured together in sequence at last. In this way, in the POS system, when the input of the quantity of the products is received, if the read product is a product subject to the radioactivity measurement, the quantity input is invalidated, and the individual products are scanned by using the scanner.

After all the subject products are registered as the products, the processing proceeds to payment processing.

The POS system according to this embodiment acquired in this way can check whether or not a subject product is radioactively contaminated with little increase in the workload when the barcode is read by the barcode reading part 31 by providing the radioactivity measurement part 32 on the barcode scanner 30.

Moreover, the possibility of radioactive contamination of the product exists in the respective steps in the distribution route such as "manufacture of products", "transport of products", "wholesales", "transport", "arrival at store", and "display in store". However, according to this embodiment, whether or not the product is radioactively contaminated can be checked when the product is sold, which is the final stage of the distribution route, resulting in surely securing safety of the product sales.

Moreover, the POS system can be configured so that if the shop clerk inputs the quantity of products, the alarm is output, and the shop clerk can be forced to measure the radioactivity of all individual products, resulting in prevention of measurement omission, and an increase in safety of the product sales.

Moreover, according to this embodiment, independently of the "radioactivity reference value" defined by the country or the like, the "radioactivity threshold" stricter than the "radioactivity reference value" is uniquely defined as the threshold for the radioactive contamination, resulting in safer product sales.

The radioactivity measurement part 32 is integrated into the barcode scanner 30, and the window 32a for the radioactivity measurement part 32 is provided so as to orient in the same direction as the window 31a for the barcode reading part 31. Thus, the shop clerk can carry out both the barcode reading and the radiation dose measurement by once directing the barcode scanner 30 toward the subject product.

Second Embodiment

Figure 5:
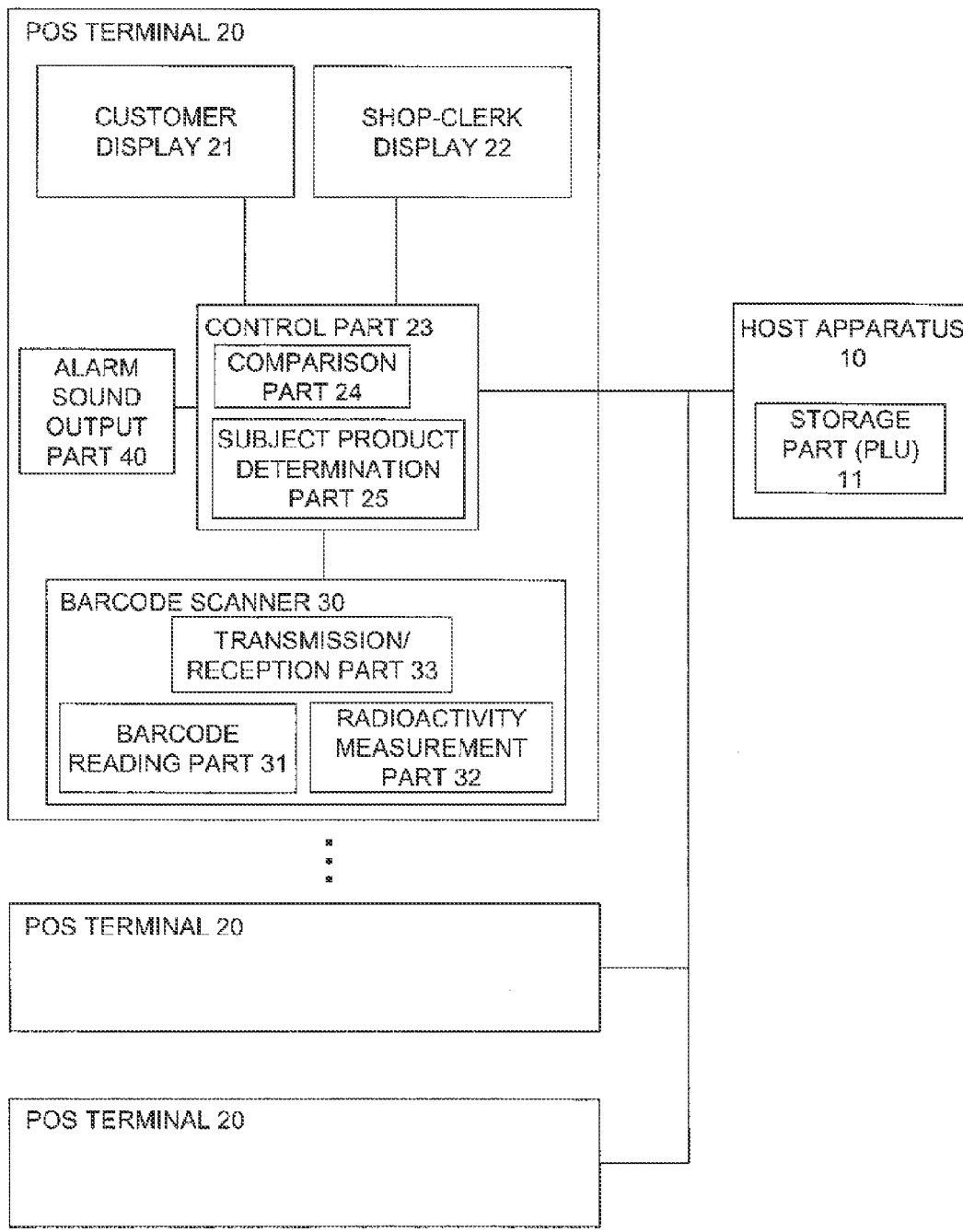
FIG. 5 is a schematic diagram illustrating a POS system according to a second embodiment of this invention.
Figure 7:
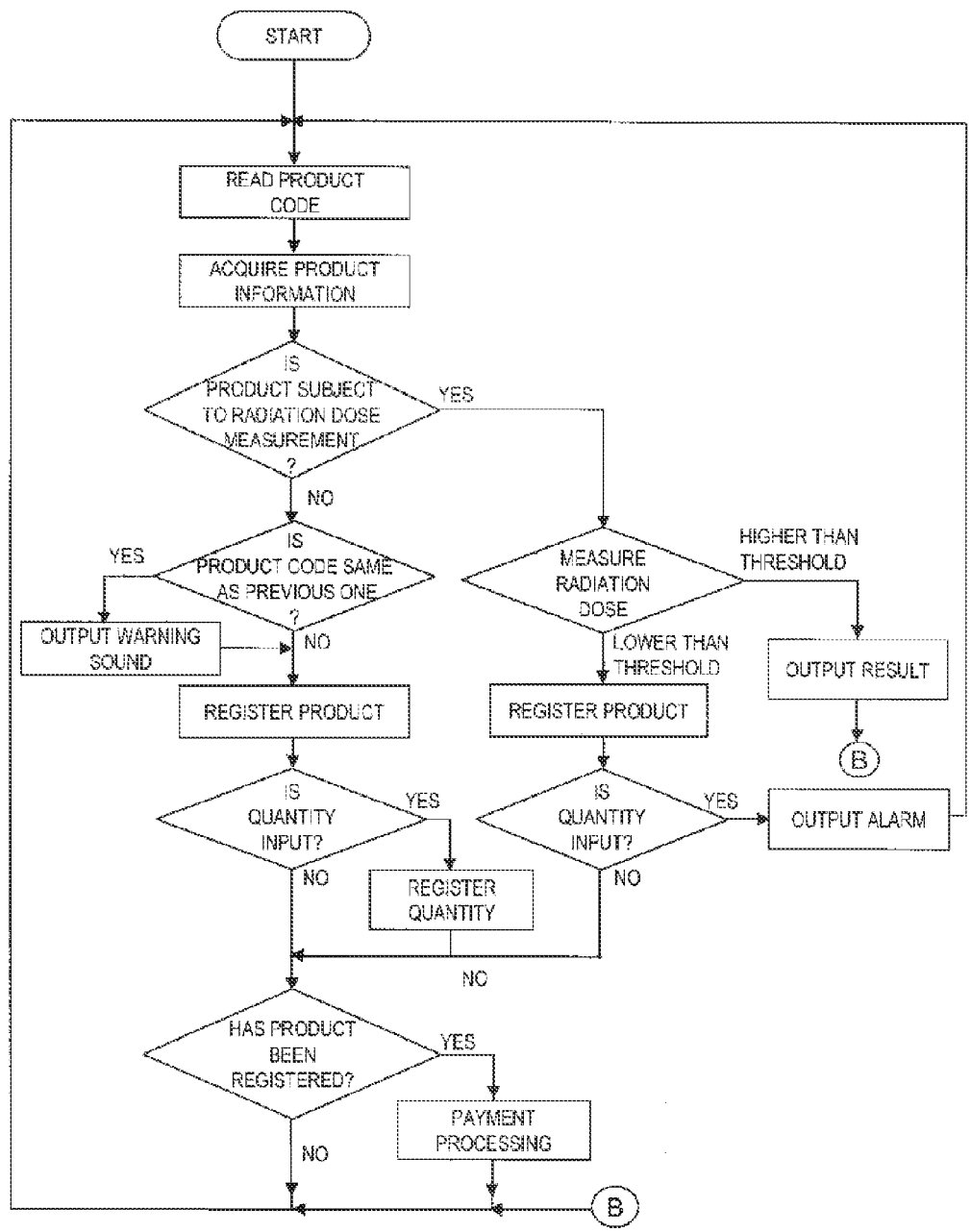
FIG. 7 is a flowchart illustrating a processing flow in the POS system according to the second embodiment.

Referring to FIGS. 5 to 7, a description is now given of a POS system according to a second embodiment of this invention.

On this occasion, the POS system according to the second embodiment is different from the POS system according to the first embodiment only in a part of the data configuration of the PLU file, and a description is given only of different points from the POS system according to the first embodiment.

First, the POS system according to the second embodiment of this invention registers, in order to limit the subjects of the radioactivity measurement to a part of products, as illustrated in FIG. 6, "radioactivity measurement determination flags" each associated with the "product code" to the PLU file stored in the storage part 11 of the host apparatus 10. In this embodiment, as illustrated in FIG. 6, flags of "1" are assigned to products which are subject to the radioactivity measurement ("Welsh onion" and "T shirt (S)"), and flags "0" are assigned to products which are not subject to the radioactivity measurement ("CD case" and "trash box"), but flags may be assigned to only the products subject to the radioactivity measurement.

Moreover, the control part 23 of the POS terminal 20 further includes a subject product determination part 25 for determining whether or not a product is subject to the radioactivity measurement by using the "radioactivity measurement determination flag". Note that, similarly to the comparison part 24, the subject product determination part may be provided on the host apparatus 10 or the barcode scanner 30.

Moreover, an alarm sound output part 40 for outputting an alarm sound is further provided on the POS terminal 20. Note that, the alarm sound output part 40 may be provided on the barcode scanner 30 side.

Moreover, as illustrated in FIG. 7, the following difference is generated between the first embodiment and the second embodiment also in terms of the processing flow of the POS system.

Specifically, in the second embodiment, after the barcode reading part 31 reads the barcode, and the product information is acquired from the PLU file, a step of determining whether or not the product is subject to the radioactivity measurement is included. For example, in this embodiment, as illustrated in FIG. 6, "Welsh onion" and "T shirt (S)" are subject to the radioactivity measurement, but "CD case" and "trash box" are not subject to the radioactivity measurement.

Then, in the step, if it is determined that the product from which the product code is read is subject to the radioactivity measurement, as illustrated in FIG. 7, similarly to the first embodiment, it is determined whether or not the radioactive contamination of the product is present. Moreover, if the product is subject to the radioactivity measurement, in order to surely measure the radioactivity of all the products, if the quantity of the products is input, the quantity input is invalidated by outputting an alarm. If the product is subject to the radioactivity measurement, in order to register a plurality of the same products, a shop clerk carries out the reading of the product code for a plurality of times. The processing proceeds to the product code reading after the alarm output in the processing flow, but after such a message that "You cannot input quantity of products, and please scan product" may be output, and the processing may proceed to the product code reading after the shop clerk depresses the clear button.

On the other hand, in this step, if it is determined that the product is not the subject to the radioactivity measurement, as illustrated in FIG. 6, it is determined whether or not the product code of a previous product and the product code of the product under processing are the same, and if the product codes are the same, a warning sound is output from the alarm sound output part 40.

Then, if the product is not subject to the radioactivity measurement, as illustrated in FIG. 6, the quantity input of the products is received as necessary, which is different from the case where the product is subject to the radioactivity measurement.

The POS system according to this embodiment acquired in this way can carry out, in addition to the effects of the first embodiment, the smooth processing by limiting the subjects of the radioactivity measurement to a part of products.

Third Embodiment

Figure 8:
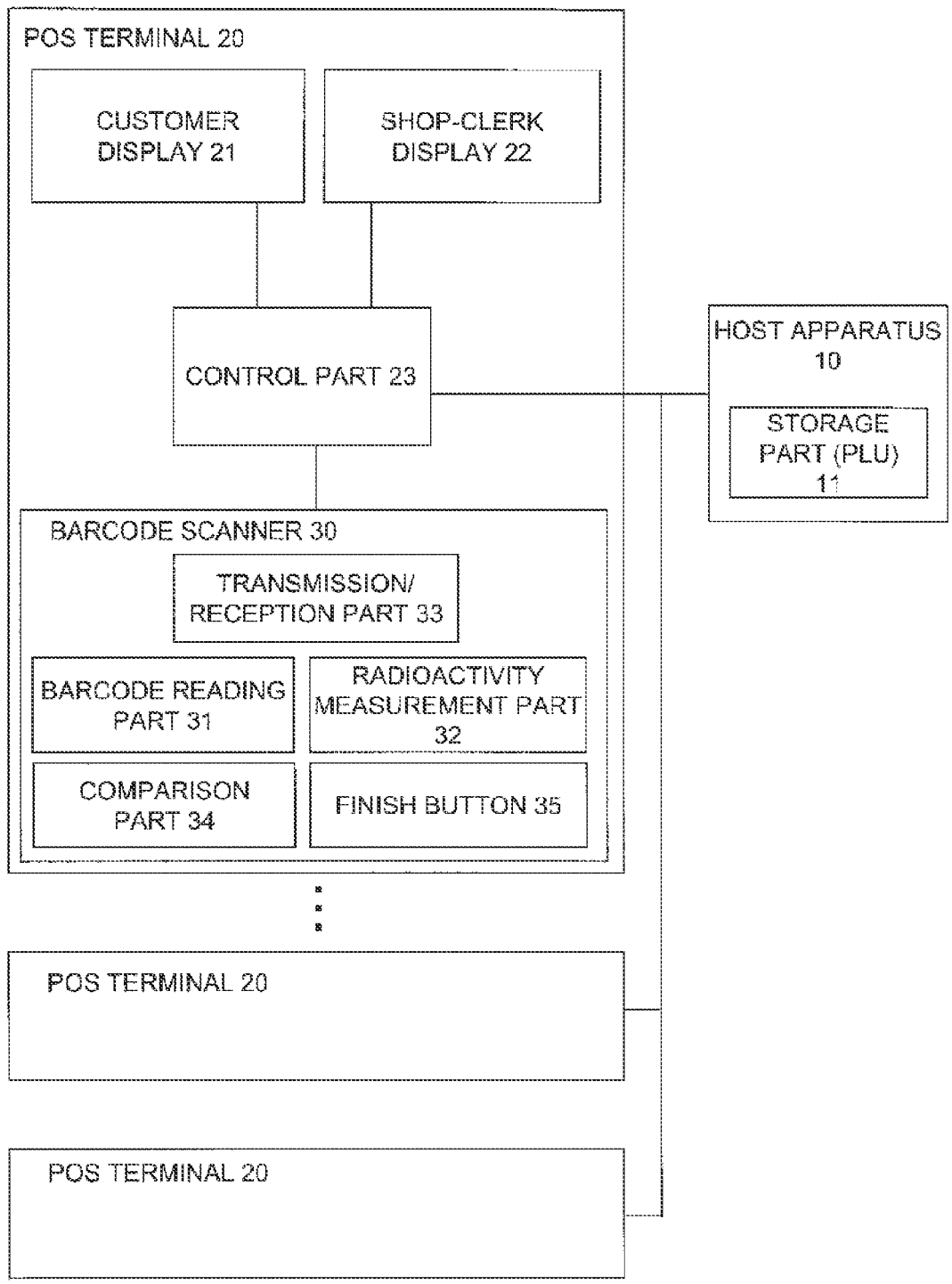
FIG. 8 is a schematic diagram illustrating a POS system according to a third embodiment of this invention.
Figure 9:
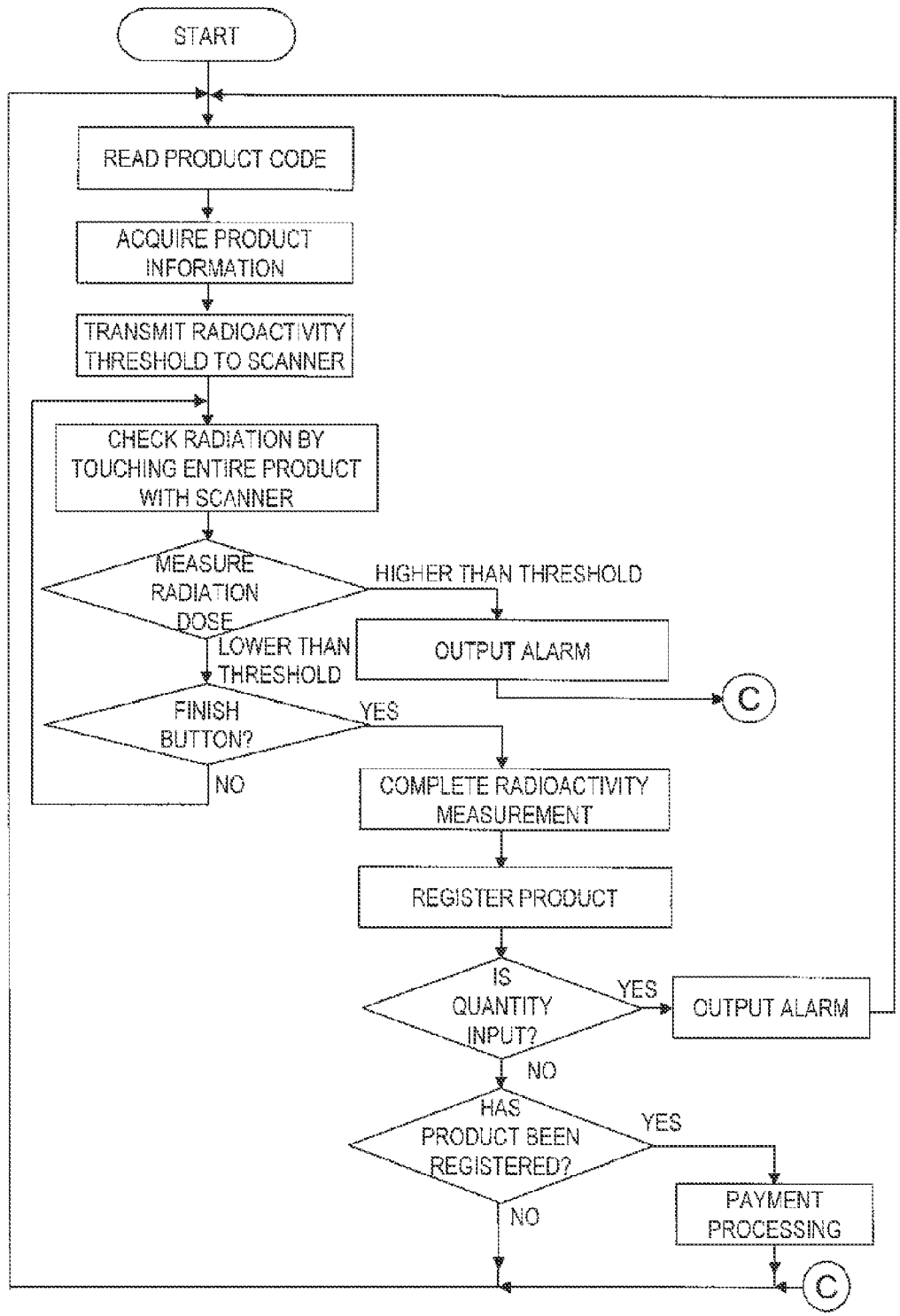
FIG. 9 is a flowchart illustrating a processing flow in the POS system according to the third embodiment.

Referring to FIGS. 8 and 9, a description is now given of a POS system according to a third embodiment of this invention.

On this occasion, the POS system according to the third embodiment is different from the POS system according to the first embodiment only in parts such as an installed location of the comparison part for comparing the "radioactivity measurement value" and the "radioactivity threshold" with each other, and a description is given of only different points from the POS system according to the first embodiment.

First, in the first embodiment, the comparison part 24 for comparing the "radioactivity measurement value" and the "radioactivity threshold" with each other is provided on the control part 23 of the POS terminal 20, but, in the third embodiment, a comparison part 34 for comparing the "radioactivity measurement value" and the "radioactivity threshold" with each other is provided on the barcode scanner 30 side. The comparison part 34 is constructed by a control chip and the like built into the barcode scanner 30.

Moreover, as illustrated in FIG. 8, a finish button 35 for finishing the radiation dose measurement is further provided on the barcode scanner 30 according to this embodiment.

Moreover, as illustrated in FIG. 9, the following difference is generated between the first embodiment and the third embodiment also in terms of the processing flow of the POS system.

Specifically, in the third embodiment, after the barcode reading part 31 reads the barcode, and the product information is acquired from the PLU file, the "radioactivity threshold" is transmitted to the barcode scanner 30. When the "radioactivity threshold" is received, the shop clerk uses the barcode scanner 30 including the radioactivity measurement part 32 to measure the radioactivity over the entire product across a plurality of locations.

Then, when the "radioactivity measurement value" exceeds the "radioactivity threshold" in the radioactive contamination check step, an alarm is output. Note that, the output destination of the alarm and the contents of the alarm in this case are the same as those in the first embodiment.

On the other hand, when, in the radioactive contamination check step, all the measured "radioactivity measurement values" of the subject products fall below the "radioactivity threshold", the radioactivity measurement is finished by the shop clerk depressing the finish button 35, and the product registration of the subject product is carried out.

The POS system according to this embodiment acquired in this way can check the radioactive contamination of the subject product across the plurality of locations, resulting in safer product sales. The POS system is particularly effective for a large product, a product having many recesses and protrusions, and an assembly of a large quantity of products. Moreover, a difference in hardware from the existing POS system is concentrated on the barcode scanner as a single unit, and the radioactivity measurement is enabled by an update.

Fourth Embodiment

Figure 10:
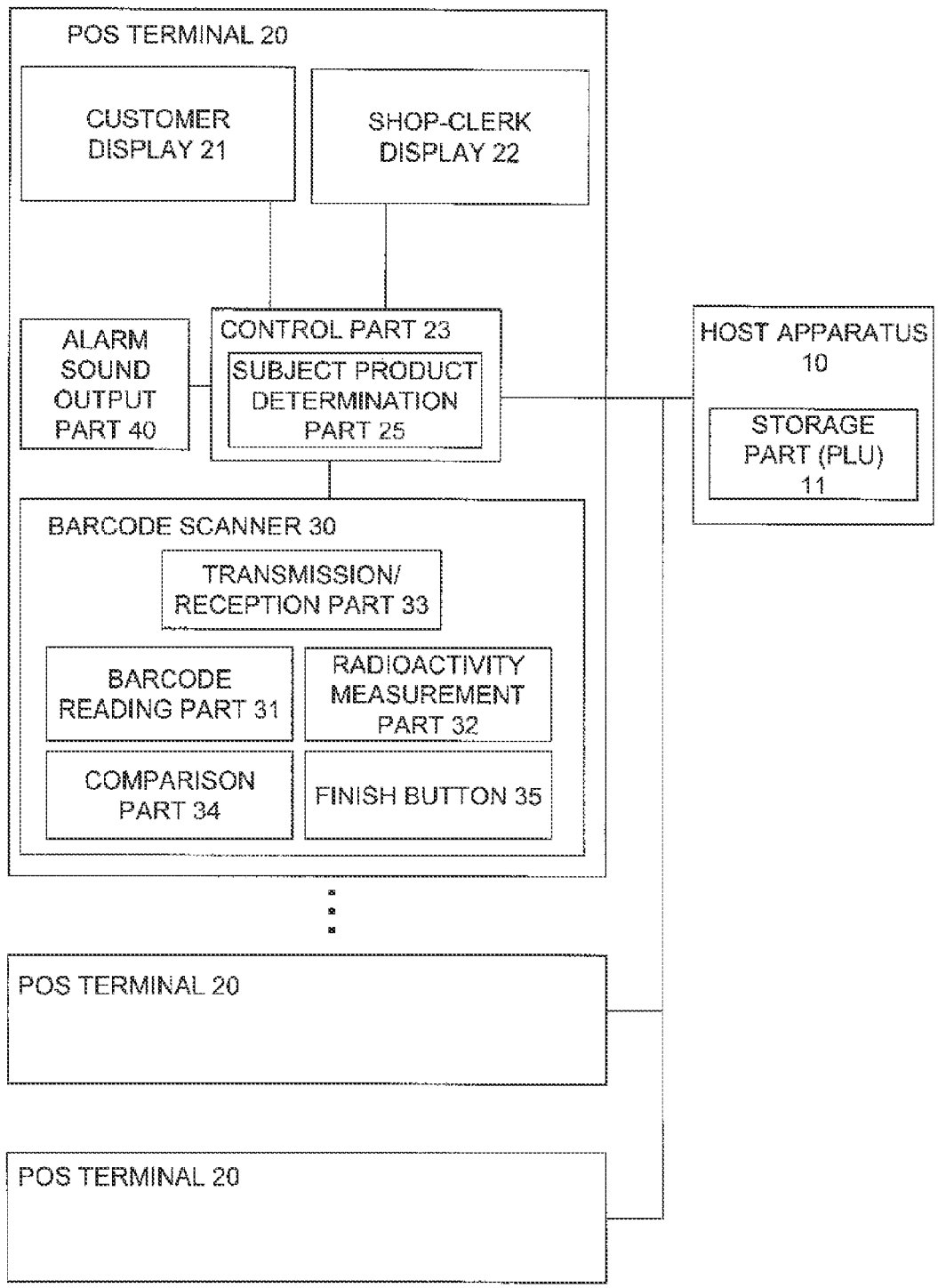
FIG. 10 is a schematic diagram illustrating a POS system according to a fourth embodiment of this invention.
Figure 11:
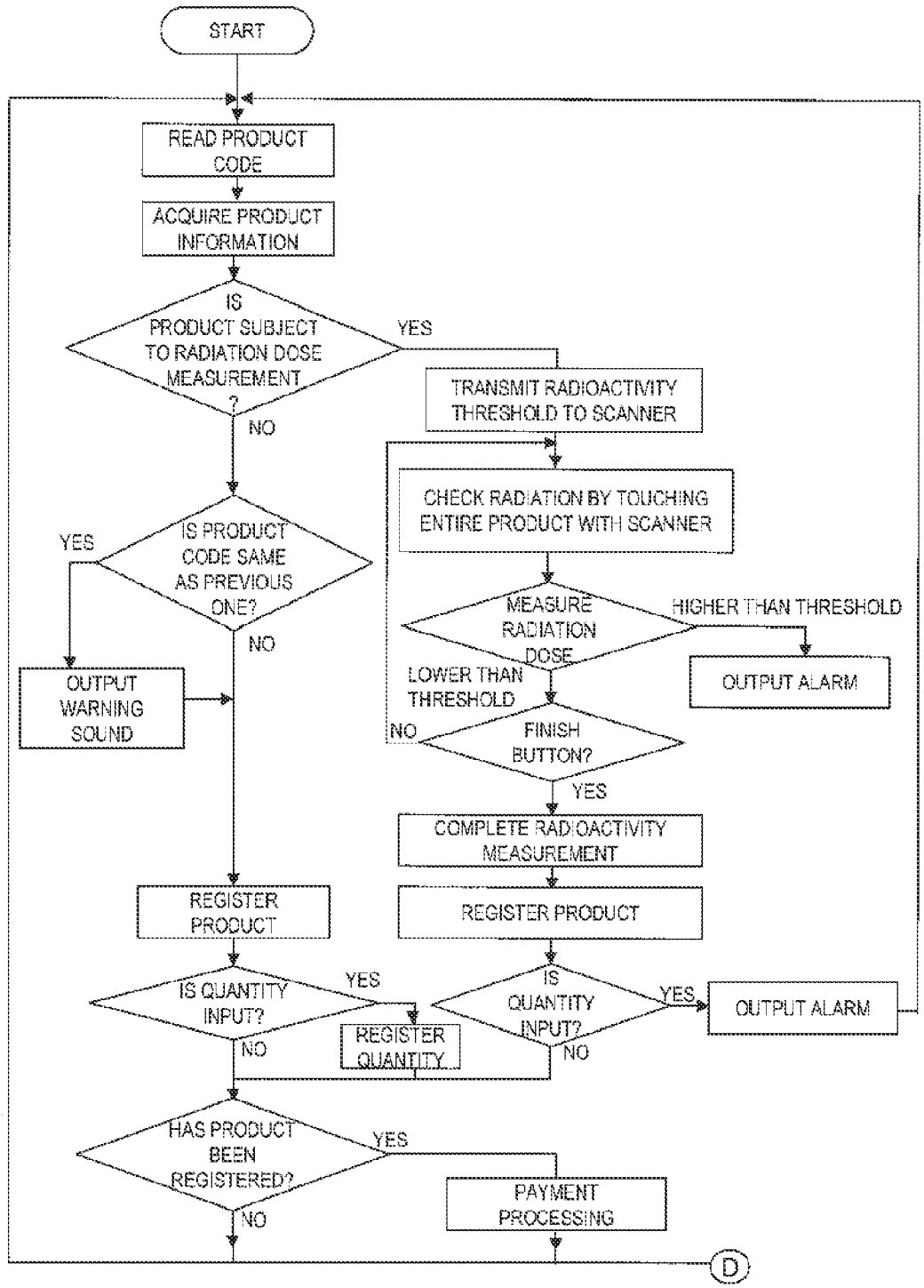
FIG. 11 is a flowchart illustrating a processing flow in the POS system according to the fourth embodiment.

Referring to FIGS. 10 and 11, a description is now given of a POS system according to a fourth embodiment of this invention.

On this occasion, the POS system according to the fourth embodiment is different from the POS system according to the second embodiment only in parts such as an installed location of the comparison part for comparing the "radioactivity measurement value" and the "radioactivity threshold" with each other, and a description is given of only different points from the POS system according to the second embodiment.

First, in the second embodiment, the comparison part 24 for comparing the "radioactivity measurement value" and the "radioactivity threshold" with each other is provided on the control part 23 of the POS terminal 20, but, in the fourth embodiment, the comparison part 34 for comparing the "radioactivity measurement value" and the "radioactivity threshold" with each other is provided on the barcode scanner 30 side. The comparison part 34 is constructed by a control chip and the like built into the barcode scanner 30.

Moreover, as illustrated in FIG. 10, the finish button 35 for finishing the radiation dose measurement is further provided on the barcode scanner 30 according to this embodiment.

Moreover, as illustrated in FIG. 11, the following difference is generated between the second embodiment and the fourth embodiment also in terms of the processing flow of the POS system.

Specifically, in the fourth embodiment, after the barcode reading part 31 reads the barcode, the product information is acquired from the PLU file, and whether or not the product is subject to the radioactivity measurement is determined, if the product is subject to the radioactivity measurement, the "radioactivity threshold" is transmitted to the barcode scanner 30. When the "radioactivity threshold" is received, the shop clerk uses the barcode scanner 30 including the radioactivity measurement part 32 to measure the radioactivity over the entire product across a plurality of locations.

Then, when the "radioactivity measurement value" exceeds the "radioactivity threshold" in the radioactive contamination check step, an alarm is output. Note that, the output destination of the alarm and the contents of the alarm in this case are the same as those in the second embodiment.

On the other hand, if, in the radioactive contamination check step, all the "radioactivity measurement values" fall below the "radioactivity threshold", the radioactivity measurement is finished by the shop clerk depressing the finish button 35 provided on the barcode scanner 30, for example, and the product registration of the subject product is carried out.

The POS system according to this embodiment acquired in this way can check the radioactive contamination of the subject product across a plurality of locations, resulting in safer product sales, and limits the subject of the radioactivity measurement to a part of the products, resulting in smooth processing, in addition to providing the effects according to the second embodiment.

Fifth Embodiment

Figure 12:
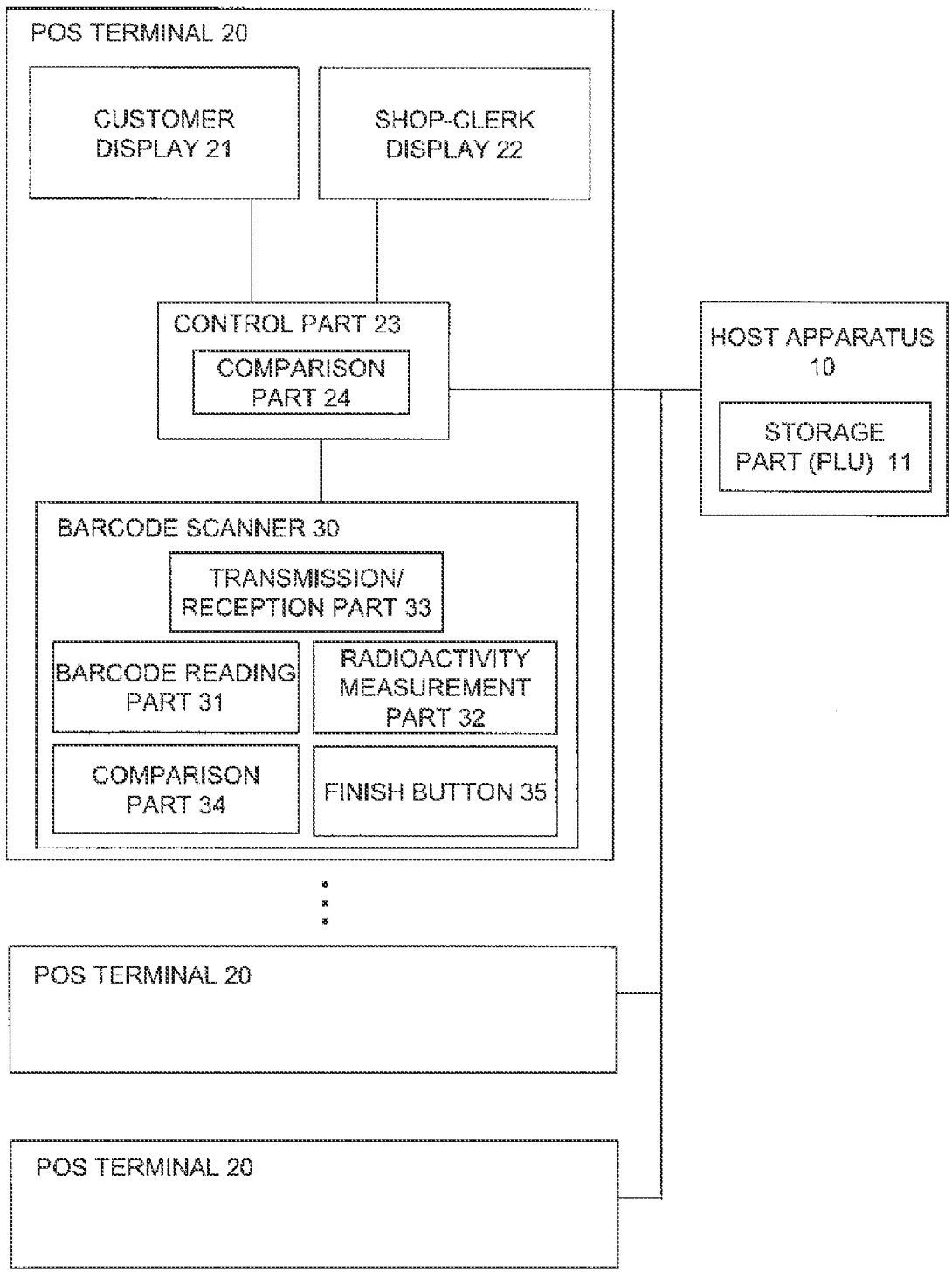
FIG. 12 is a schematic diagram illustrating a POS system according to a fifth embodiment of this invention.
Figure 13:
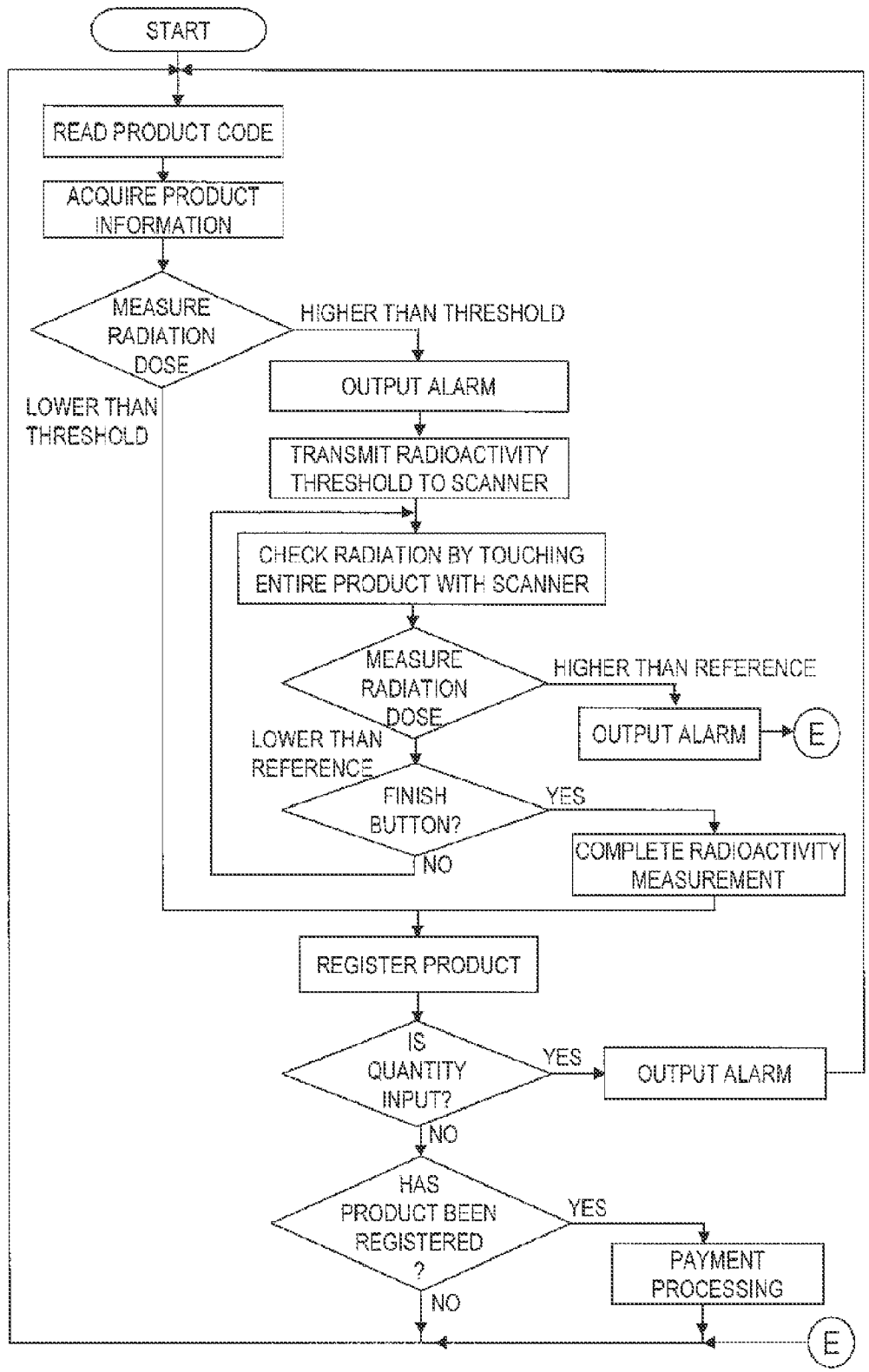
FIG. 13 is a flowchart illustrating a processing flow in the POS system according to the fifth embodiment.

Referring to FIGS. 12 and 13, a description is now given of a POS system according to a fifth embodiment of this invention.

On this occasion, the POS system according to the fifth embodiment of this invention is different from the POS system according to the first embodiment in such a point that the check of the radioactive contamination is carried out on two stages. A description is now given of only different points between the POS system according to the fifth embodiment and the POS system according to the first embodiment.

In the first embodiment, the comparison part 24 of the POS terminal 20 carries out the check of the radioactive contamination by using the "radioactive threshold" in the single-stage method. In contrast, in the fifth embodiment, first, the check of the radioactive contamination on a first stage is carried out by using the "radioactivity threshold", and the radiation dose over an entire product is measured only for products each having the "radioactivity measurement value" exceeding the "radioactivity threshold" in the check of the radioactive contamination on the first stage, and a check of the radioactive contamination on a second stage is carried out by using the "radioactivity reference value". Note that, two types of "radioactivity threshold" may be provided for the respective checks of the radioactive contamination.

First, in the POS system according to the fifth embodiment, the comparison part 24 for comparing the "radioactivity threshold" and the "radioactivity measurement value" with each other to carry out the check of the radioactive contamination on the first stage is provided on the control part 23 of the POS terminal 20. Moreover, the comparison part 34 for comparing the "radioactivity reference value" and the "radioactivity measurement value" with each other to carry out the check of the radioactive contamination on the second stage is provided on the barcode scanner 30. The comparison part 34 is constructed by a control chip and the like built into the barcode scanner 30.

Note that, the two-stage measurement may be carried out as follows. Specifically, the comparison part 34 provided on the barcode scanner 30 is used to carry out the check of the radioactive contamination on the first stage by using the "radioactivity threshold", and to carry out the check of the radioactive contamination on the second stage by using the "radioactivity reference value" without providing the comparison part 24 on the POS terminal 20 side.

Moreover, as illustrated in FIG. 12, the finish button 35 for finishing the radiation dose measurement is further provided on the barcode scanner 30 according to this embodiment.

Moreover, as illustrated in FIG. 13, the following difference is generated between the first embodiment and the fifth embodiment also in terms of the processing flow of the POS system.

Specifically, in the fifth embodiment, after the barcode reading part 31 reads the barcode and acquires the product information, the radiation does close to the barcode of the product is measured, and the "radioactivity threshold" and the "radioactivity measurement value" are compared with each other, to thereby carry out the check of radioactive contamination on the first stage.

Then, only if the "radioactivity measurement value" exceeds the "radioactivity threshold" in the check of the radioactive contamination on the first stage, the shop clerk is notified of necessity of the check of the radioactive contamination on the second stage, for example, though use of the shop-clerk display 22, for example, and the "radioactivity reference value" is transmitted to the barcode scanner 30, thereby causing the shop clerk to check the radioactive contamination on the second stage. Specifically, the check of the radioactive contamination on the second stage is carried out by the shop clerk using the barcode scanner 30 including the radioactivity measurement part 32 to measure the radioactivity over the entire product across plurality of locations.

An output destination and alarm contents for notifying the shop clerk of the necessity of the check of the radioactive contamination on the second stage may include any kinds of output destinations and alarm contents as long as the destination and the contents of the alarm notify the shop clerk of the necessity of the check of the radioactive contamination on the second stage.

Then, when the "radioactivity measurement value" exceeds the "radioactivity reference value" in the check of the radioactive contamination on the second stage, an alarm is output. Note that, the output destination of the alarm and the contents of the alarm in this case are the same as those in the first embodiment.

On the other hand, when, in the check of the radioactive contamination on the second stage, all the measured "radioactivity measurement values" of the subject product fall below the "radioactivity reference value", the radioactivity measurement is finished by the shop clerk depressing the finish button 35, and the product registration of the subject product is carried out.

The POS system according to this embodiment acquired in this way is configured to carry out the more-detailed check of the radioactive contamination on the second stage by using the "radioactivity reference value" only for the product for which such a determination that the radioactive contamination is suspected has been made by the check of the radioactive contamination on the first stage, resulting in more assured check of the radioactive contamination of a product while an increase in workload on the shop clerk is suppressed. Moreover, a time period required for the entire measurement can be reduced for operation by separating the check into the first stage and the second stage.

Sixth Embodiment

Figure 14:
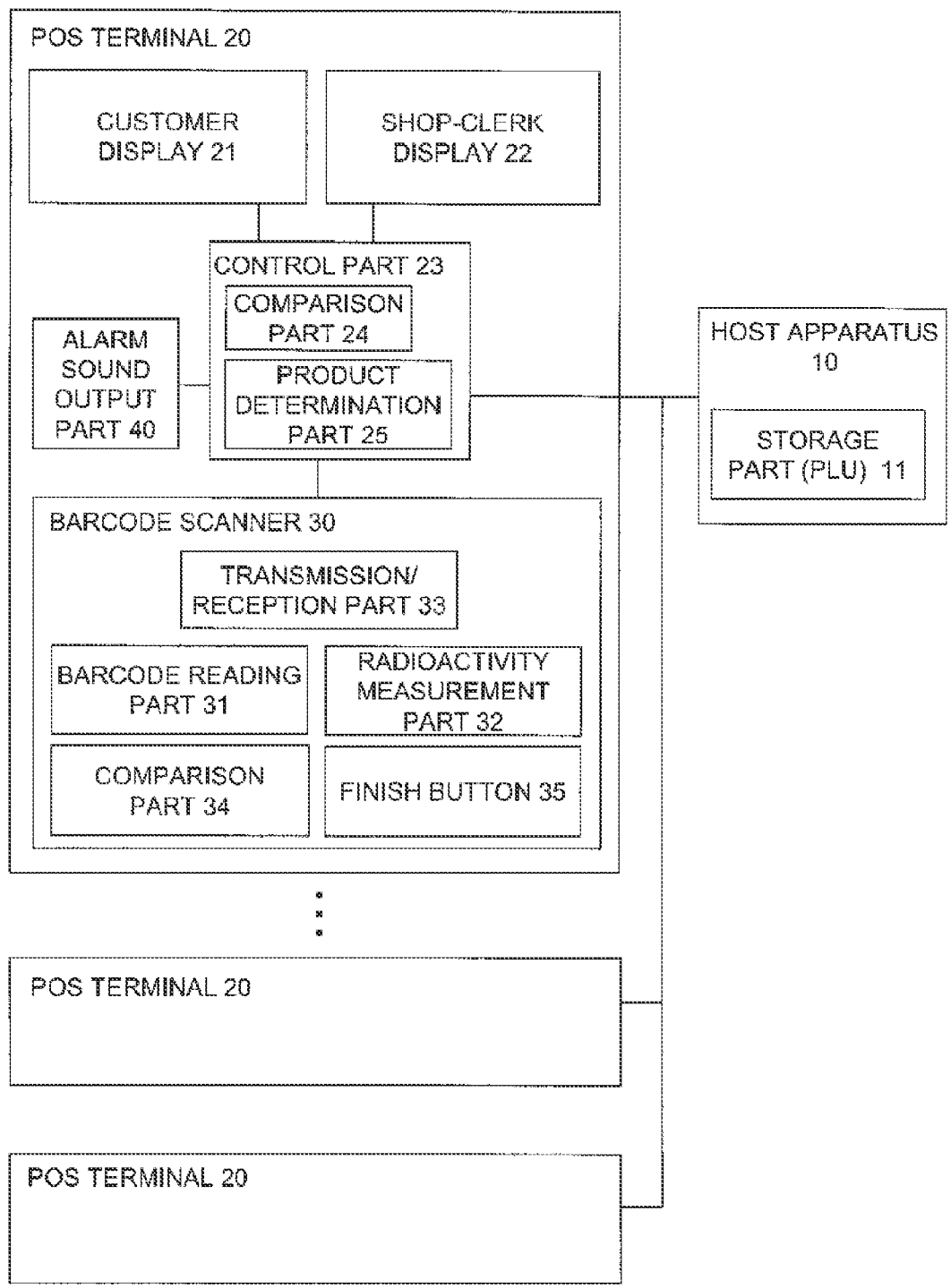
FIG. 14 is a schematic diagram illustrating a POS system according to a sixth embodiment of this invention.
Figure 15:
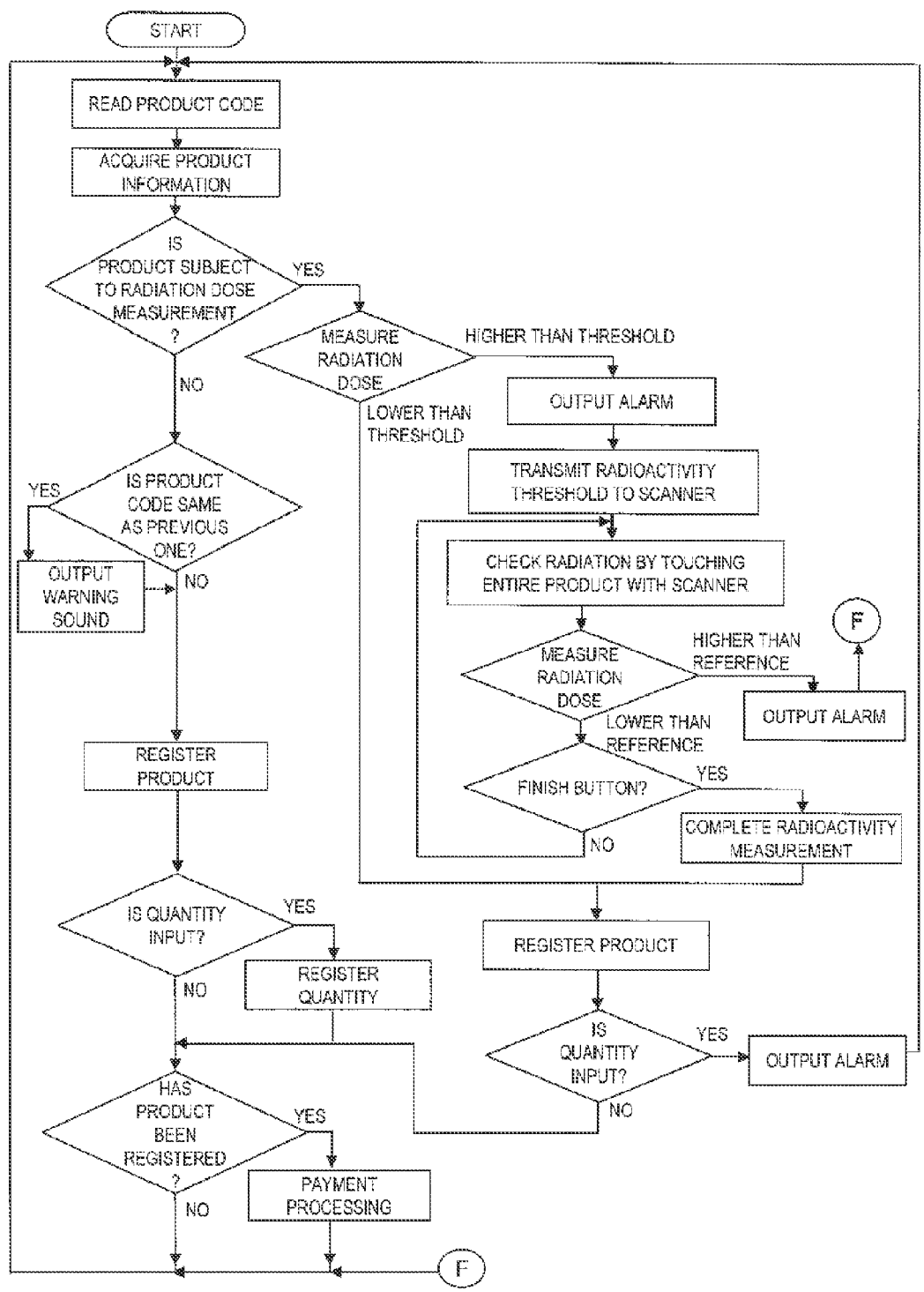
FIG. 15 is a flowchart illustrating a processing flow in the POS system according to the sixth embodiment.

Referring to FIGS. 14 and 15, a description is now given of a POS system according to a sixth embodiment of this invention.

On this occasion, the POS system according to the sixth embodiment is different from the POS system according to the fifth embodiment only in such a point that the radioactive contamination is checked only for specific products, and a description is only given of the point different from the POS system according to the fifth embodiment.

First, the POS system according to the sixth embodiment registers, in order to limit the subjects of the radioactivity measurement to a part of products, the "radioactivity measurement determination flags" each associated with the "product code" to the PLU file stored in the storage part 11 of the host apparatus 10. In this embodiment, flags of "1" are assigned to products which are subject to the radioactivity measurement, and flags "0" are assigned to products which are not subject to the radioactivity measurement, but flags may be assigned to only the products subject to the radioactivity measurement.

Moreover, the control part 23 of the POS terminal 20 further includes the subject product determination part 25 for determining whether or not a product is subject to the radioactivity measurement by using the "radioactivity measurement determination flag". Note that, similarly to the comparison part 24, the subject product determination part may be provided on the host apparatus 10 or the barcode scanner 30.

Moreover, the alarm sound output part 40 for outputting an alarm sound is further provided on the POS terminal 20. Note that, the alarm sound output part 40 may be provided on the barcode scanner 30 side.

Moreover, as illustrated in FIG. 15, the following difference is generated between the fifth embodiment and the sixth embodiment also in terms of the processing flow of the POS system.

Specifically, in the sixth embodiment, after the barcode reading part 31 reads the barcode and acquires the product information, a step of determining whether or not the product is subject to the radioactivity measurement is included.

Then, in the step, if it is determined that the product is subject to the radioactivity measurement, as illustrated in FIG. 15, similarly to the fifth embodiment, it is determined whether or not the radioactive contamination of the product is present. Moreover, if the product is subject to the radioactivity measurement, in order to surely measure the radioactivity of all the products, if the quantity of the products is input, the quantity input is invalidated by outputting an alarm. If the product is subject to the radioactivity measurement, in order to register a plurality of the same products, the product code is read for a plurality of times. The processing proceeds to the product code reading after the alarm output in the processing flow, but after such a message that "You cannot input quantity of products, and please scan product" may be output, and the processing may proceed to the product code reading after the shop clerk depresses the clear button.

On the other hand, in this step, if it is determined that the product is not subject to the radioactivity measurement, as illustrated in FIG. 15, it is determined whether or not the product code of a previous product and the product code of the product under processing are the same, and if the product codes are the same, a warning sound is output from the alarm sound output part 40.

Then, if the product is not subject to the radioactivity measurement, as illustrated in FIG. 15, the quantity input of the products is received as necessary, which is different from the case where the product is subject to the radioactivity measurement.

The POS system according to this embodiment acquired in this way can limit, in addition to the effects of the fifth embodiment, the subjects of the radioactivity measurement to a part of products.

Seventh Embodiment

Figure 16:
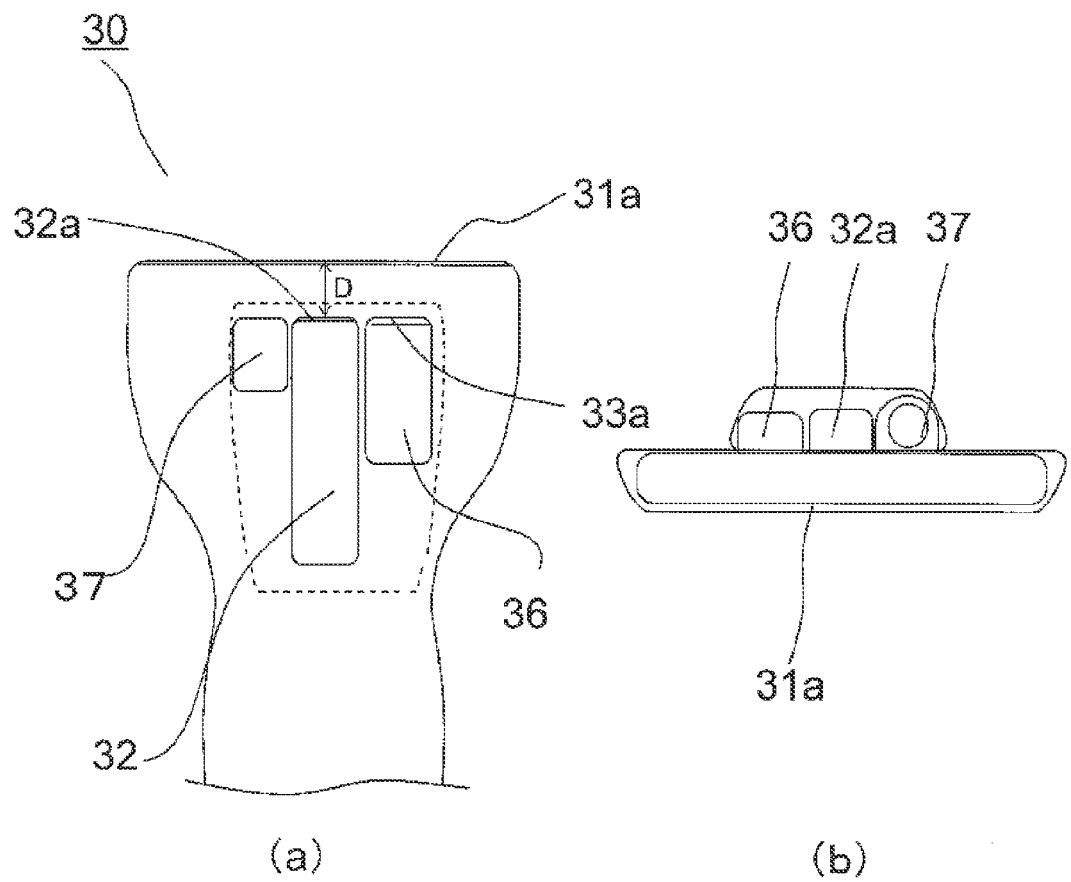
FIG. 16 includes (a) a top view and (b) a front view of a barcode scanner according to a seventh embodiment of this invention.

Referring to FIG. 16, a description is now given of a POS system according to a seventh embodiment of this invention.

In the POS system according to the seventh embodiment, a distance measurement part 36 for measuring a distance to a product subject to the scan is provided on the barcode scanner 30. The other configuration is the same as those of the POS system according to the preceding embodiments, and a description thereof is therefore omitted.

The distance measurement part 36 only needs to carry out the measurement by means of infrared rays, ultrasonic waves, or a laser, for example, and may employ any method.

The distance between the product and the radioactivity measurement part 32 (barcode scanner 30) measured by the distance measurement part 36 is used to instruct the shop clerk to correct a measurement position, to record the measurement distance in a database, and to correct calculation of the radioactivity value based on the measured radiation. Moreover, as illustrated in FIG. 16, an imaging portion 37 arranged with the radioactivity measurement part 32 may be provided on the barcode scanner 30. An image is acquired by the imaging part 37 during the measurement or after the radiation is detected, and is recorded in a database in association with the product code.

The POS system according to this embodiment acquired in this way assists in making a database of the detected subject products while a detection accuracy of the radiation/radioactivity is increased, as well as providing the effects of the preceding embodiments.

The PLU file is stored in the storage part of the host apparatus in the first to seventh embodiments, but the PLU file may be stored in the storage part of the POS terminal.

Moreover, a two-dimensional code such as a QR code or an IC tag may be read in place of the barcode.

Moreover, if the product is subject to the radioactivity measurement, the quantity input is not permitted in the first to seventh embodiments. However, an operation may be performed under an assumption that the same products have the same place of production and hence the radioactivity needs to be measured only for one of the products. In this case, the quantity input may be permitted.

Moreover, the scanner is not limited to a hand scanner, and the radiation may be measured by means of a fixed scanner.

Moreover, even in a POS system with which products are not individually scanned but a group of products are scanned at once in each carrier such as a basket or a cart, the radioactivity is preferably measured for individual products subject to the detection. Moreover, on this occasion, a radioactivity measurement part for measuring the radiation dose of the entire carrier in which the products are put may be provided independently of or in common with the above-mentioned radioactivity measurement part. In this case, simple measurement (check of the radioactive contamination on the first state) may be carried out for each carrier, and then, individual measurement (check of the radioactive contamination on the second stage) may be carried out as necessary.

Moreover, a result of the simple measurement for each carrier and a sum of results of the radioactivity measurement measured individually may be compared with each other, and if an estimated value of the radiation dose emitted from the carrier is exceeded, an alert may be output. On this occasion, a coefficient is preferably used for correction during the comparison. As a result, radioactive contamination due to an omission in measurement of products for which the flag is not set or the like may be detected.

Figure 17:
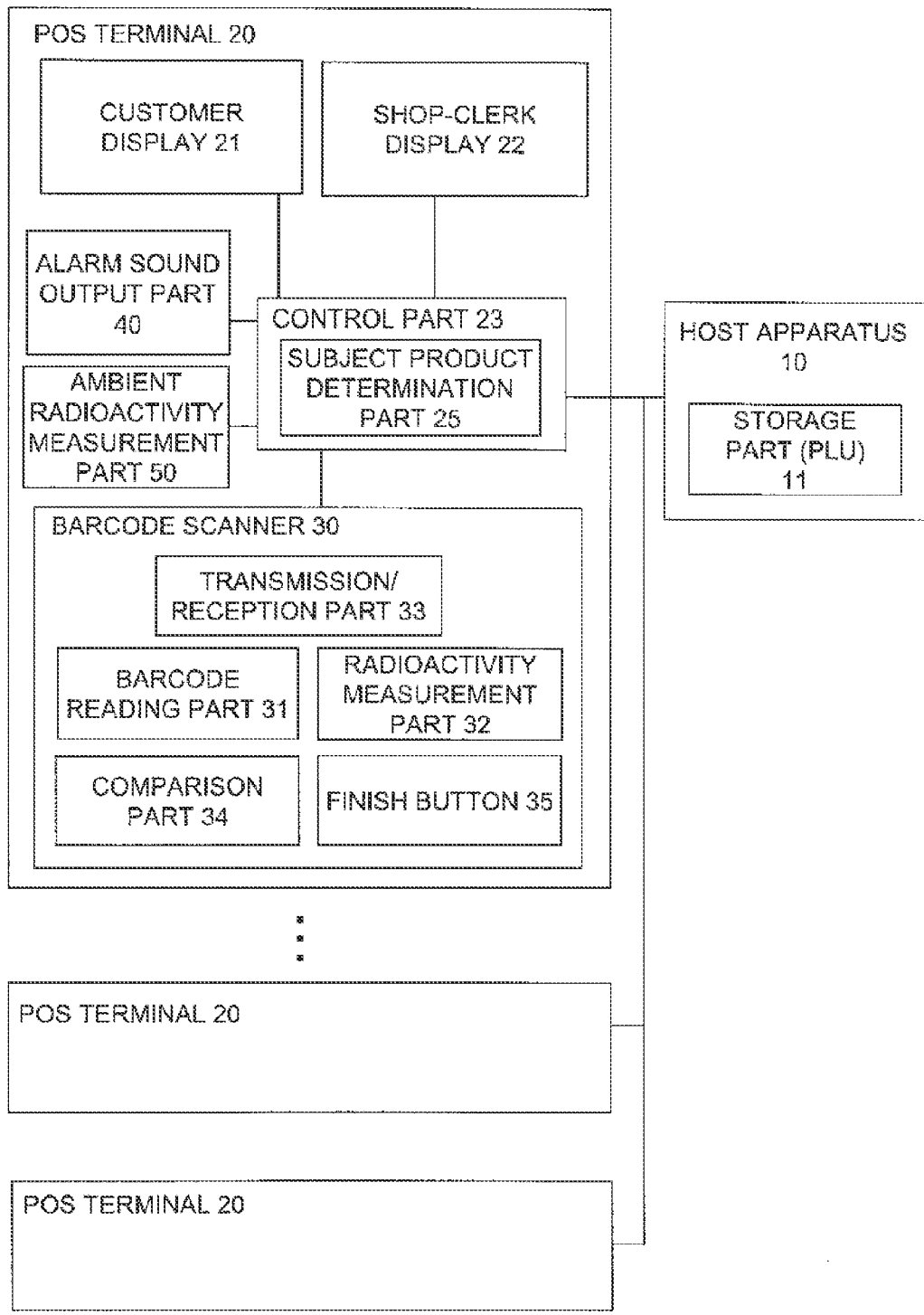
FIG. 17 is a schematic diagram illustrating a POS system according to an embodiment of this invention.

Moreover, when the radiation is measured by the POS terminal, an external influence is preferably shielded/reduced. In a simple configuration, a structure for shielding the radiation entering into a space for measurement is provided. Moreover, for the same purpose, as illustrated in FIG. 17, an ambient radioactivity measurement part for measuring an external radiation dose flowing into the space for measurement is provided for each POS terminal or as the POS system. Processing of correcting a measurement value of a radiation from a product subject to detection by using the external radiation dose acquired by the ambient radioactivity measurement part is carried out when the radioactivity of the product subject to the detection is measured. This configuration can increase the measurement accuracy for the radioactivity as the POS system or the POS terminal. As a result, detection of an extremely small amount of a radioactive substance, which is preferably carried out for food, can be carried out highly accurately.

Further, the specific configuration according to this invention is not limited to the embodiments described above, and this invention encompasses changes made without departing from the gist of this invention.

For example, by recoding and maintaining the novel software part of the POS system on a recording medium such as an optical disc, and reading the software part from the recording medium into the POS system, the existing POS system can be updated so as to adapt to the radioactivity measurement. Moreover, on this occasion, the scanner described in the third embodiment may be used. Moreover, the POS system may be simply combined with a general personal computer.

This application claims priority from Japanese Patent Application No. 2011-119184, filed on May 27, 2011, the entire disclosure of which is incorporated herein by reference.

REFERENCE SIGNS LIST

1 . . . POS system
10 . . . host apparatus
11 . . . storage part (storage means)
20 . . . POS terminal
21 . . . customer display
22 . . . shop-clerk display
23 . . . control part (alert output part)
24 . . . comparison part (comparison means)
25 . . . subject product determination part
30 . . . barcode scanner (product code scanner)
31 . . . barcode reading part
31*a* . . . window for reading barcode
32 . . . radioactivity measurement part
32*a* . . . window for measuring radioactivity
33 . . . transmission/reception part
34 . . . comparison part
35 . . . finish button
36 . . . distance measurement part
37 . . . imaging portion
40 . . . alarm sound output part
50 . . . ambient radioactivity measurement part

The invention claimed is:

1. A point of sales (POS) system, comprising:
a storage configured to store product codes for identifying each product information of each product and a radioactivity threshold of the each product defined for the each product code, the product code and the radioactivity threshold being associated with each other;
a barcode scanner which includes a barcode reading part for reading the product code from a barcode attached to the product together with a radioactivity measurement part which is built within the barcode scanner and which is configured to measure the radioactivity of the product based on a radiation dose emitted from the product;
a comparator configured to compare the radioactivity threshold corresponding to the product code read by the barcode reading part with a radioactivity measurement value measured by the radioactivity measurement part;
an alarm output unit configured to generate an alarm when the radioactivity measurement value exceeds the radioactivity threshold; and
a control part configured to register the product information in the storage by using the product code;

wherein the control part is configured to acquire the product code from the barcode scanner, to acquire the product information of the product code from the storage, to acquire a result of comparing the radioactivity threshold with the radioactivity measurement value from the comparator;

wherein the control part is configured to output an alarm without registering the product information when the radioactivity measurement value exceeds the radioactivity threshold, and otherwise, to register the product information in the storage;

wherein the barcode reading part and the radioactivity measurement part have windows directed to the same direction; and wherein the control part is further configured to acquire the product code of any product from the barcode reading part of the barcode scanner and to start radioactivity measurement automatically by using the radioactivity measurement part of the barcode scanner when the acquired product code of the any product is acquired by the barcode reading part.

2. A control method of registering a product purchased by a user in a point of sales (POS) system, comprising:

comparing, by a control part, a radioactivity threshold corresponding to a product code of the product read by a barcode reading part of a barcode scanner with a radioactivity measurement value of the product measured by a radioactivity measurement part built in the barcode scanner to measure radioactivity of the product based on a radiation dose emitted from the product at the time of the product code reading of the product, to produce a result of comparison;

registering, by said control part, the product code of the product in a storage when the result of comparison does not exceed the radioactivity threshold;

outputting, by an alarm output unit, an alarm without registering the product information when the radioactivity measurement value exceeds the radioactivity threshold;

wherein the barcode reading part and the radioactivity measurement part have windows directed to the same direction; and wherein the control part is further configured to acquire the product code of any product from the barcode reading part of the barcode scanner and to start radioactivity measurement automatically by using the radioactivity measurement part of the barcode scanner when the acquired product code of the any product is acquired by the barcode reading part.

3. The POS system according to claim 1, further comprising a number input part configured to input a number of the same products, and wherein when the number input part is operated to measure radioactivity of the products in question, the control part invalidates the number input of the same products input into the number input part.

* * * * *